United States Patent [19]

Peterson, Jr.

[11] Patent Number: 5,314,038
[45] Date of Patent: May 24, 1994

[54] INTERLOCK CIRCUIT FOR TRACTOR PTO
[75] Inventor: Rudolph A. Peterson, Jr., Horicon, Wis.
[73] Assignee: Deere & Company, Moline, Ill.
[21] Appl. No.: 7,431
[22] Filed: Jan. 25, 1993
[51] Int. Cl.$^5$ .............................................. B60K 28/10
[52] U.S. Cl. ..................................... 180/214; 180/53.1
[58] Field of Search ...................... 180/53.1, 53.8, 271, 180/273, 274, 277, 279

[56] References Cited

U.S. PATENT DOCUMENTS

| | | | |
|---|---|---|---|
| 2,250,754 | 7/1941 | Dooley | 180/273 |
| 2,640,898 | 6/1953 | White | 180/271 |
| 3,921,004 | 11/1975 | Stark | 180/271 |
| 4,317,500 | 3/1982 | Bening | 180/273 |
| 4,337,841 | 7/1982 | Law | 180/271 |
| 4,651,018 | 3/1987 | Peterson, Jr. | |
| 4,688,656 | 8/1987 | Kent | 180/279 |
| 4,964,485 | 10/1990 | Miele | 180/275 |
| 4,974,711 | 12/1990 | Peterson, Jr. et al. | |

*Primary Examiner*—Karin L. Tyson

[57] ABSTRACT

An interlock circuit for a vehicle such as a lawn and garden tractor with a switch-controlled PTO and obstacle sensor. The circuit provides engine shutdown and PTO disconnect if a sensor switch is tripped while the vehicle is in reverse. Engine recovery is allowed with the sensor switch tripped if the transmission is shifted out of reverse. If the tactile sensor fails to reset when the vehicle moves forward, the circuit prevents PTO reactivation. Once the sensor resets, the PTO can only be turned on by cycling the PTO switch.

12 Claims, 1 Drawing Sheet

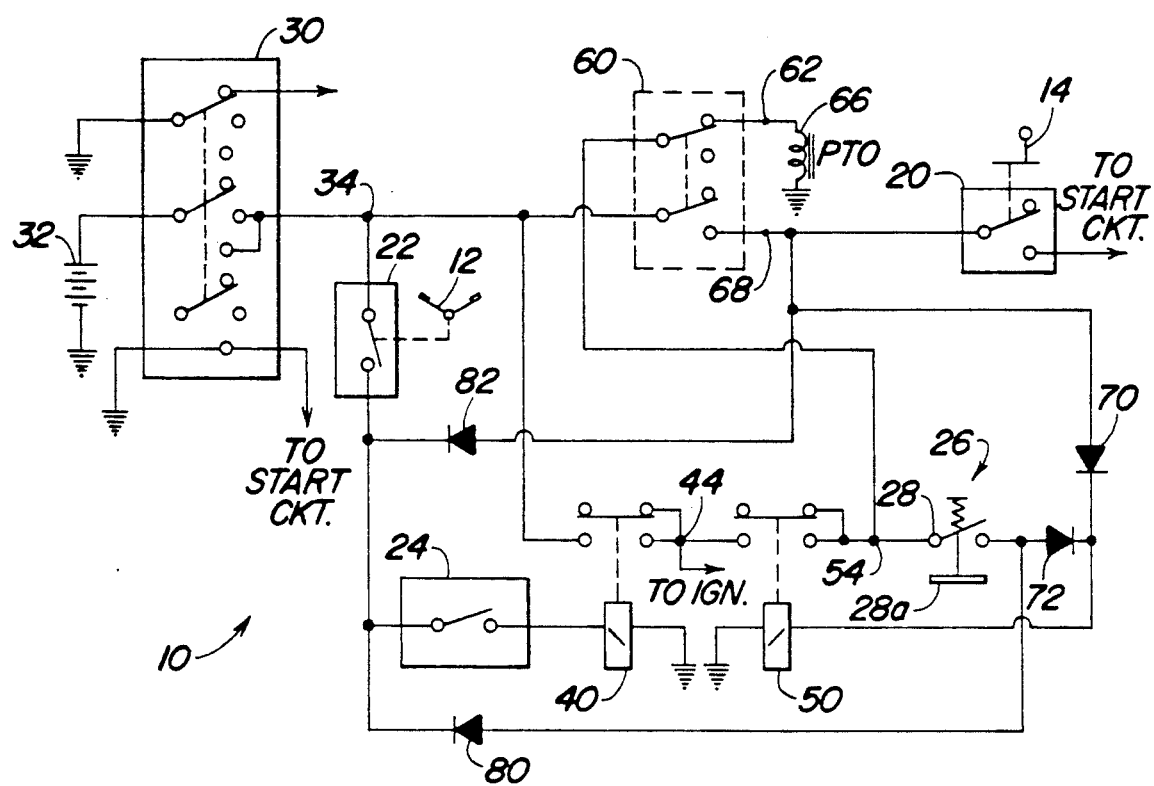

INTERLOCK CIRCUIT FOR TRACTOR PTO

BACKGROUND OF THE INVENTION

1) Field of the Invention

The present invention relates generally to interlock systems for vehicles and, more particularly, to an interlock circuit for selectively disabling operation of the vehicle engine and/or an accessory drive such as a PTO on a tractor when an obstacle is sensed.

2) Related Art

Some vehicles, including lawn and garden tractors with PTO driven accessories such as a lawn mower deck, have a PTO disconnect that prevents mowing when the vehicle is operated in reverse. When the vehicle is shifted into reverse with the PTO running, an interlock circuit with a reverse gear switch disconnects the PTO drive. The circuit therefore prevents all operation of PTO driven accessories while the vehicle is operated in reverse.

BRIEF SUMMARY OF THE INVENTION

It is an object of the present invention to provide an improved interlock circuit for a vehicle with a PTO or similar drive. It is another object to provide such a circuit which provides selective PTO operation in reverse under limited conditions and yet is relatively simple and inexpensive in construction.

It is yet another object of the present invention to provide an improved interlock circuit for a tractor or similar vehicle with a PTO. It is another object to provide such a circuit which includes an obstruction sensor and permits limited operation of the PTO when the tractor is operated in reverse but stops operation if the sensor detects an object.

It is a further object to provide an interlock circuit which stops the tractor engine when an object is detected while operating in a preselected gear with the tractor PTO engaged. It is a further object to provide such an interlock circuit which allows the tractor to recover by shifting the transmission or moving a PTO switch.

An interlock circuit includes a transmission switch and tactile sensor switch connected to a PTO switch and PTO and ignition relays. If the tactile sensor switch is tripped while the vehicle is in reverse and the PTO is engaged, the engine will be shut down and the PTO disconnected. Engine recovery is allowed with the switch tripped if the transmission is shifted out of reverse or if the PTO switch is turned off. If the tactile sensor fails to reset when the vehicle moves forward, the circuit prevents reactivation of the PTO. Once the PTO is disengaged and the sensor resets, the PTO can only be turned on by cycling the PTO switch.

These and other objects, features and advantages of the present invention will become apparent to one skilled in the art upon reading the following detailed description in view of the drawings.

BRIEF DESCRIPTION OF THE DRAWINGS

The single drawing FIGURE shows a schematic of an interlock circuit for a vehicle with a PTO.

DETAILED DESCRIPTION OF THE DRAWINGS

Referring now to the drawing FIGURE, therein is shown an interlock circuit 10 for a vehicle such as a lawn and garden tractor. A transmission includes a direction control 12 for operating in the forward and reverse directions and a gear ratio select lever 14 for operating over different ranges of speeds. A transmission switch 20 remains closed when the transmission is in neutral and opens when the transmission is shifted into gear. A vehicle direction switch 22 is closed when the transmission is in neutral or when a forward gear is selected, and opens when the transmission is shifted into reverse.

An operator presence switch 24 located at the operator's station on the vehicle closes only when the station is properly occupied by the operator. A tactile sensor 26 includes a normally closed switch 28 and an activator 28a. The sensor 26 is responsive to contact of the activator by an obstacle to open the switch 28. The activator 28a may be a spring-biased bar or similar device located near the rear of the vehicle.

The circuit 10 includes a standard ignition switch 30 connected between a source of power 32 on the vehicle and a switch output terminal 34. The terminal 34 is connected to the positive terminal on the source 32 when the ignition switch is in the run or start positions.

An ignition relay 40 includes an input terminal connected to the terminal 34 and an output terminal 44 connected to the vehicle engine ignition such that when the relay 40 is energized, a current path is established between the ignition and the terminal 34. The path is broken and the engine is disabled whenever the relay 40 is not energized. The coil of the relay 40 is connected through the operator presence switch 24 and the direction switch 22 to the terminal 34.

A PTO relay 50 has an input terminal connected to the terminal 44 of the ignition relay 40 and an output terminal 54 connected to the sensor switch 28. The terminal 54 is also connected to one input terminal of a PTO switch 60. A corresponding output terminal 62 of the switch 60 is connected to an electric clutch 66 on the PTO to engage the PTO when the terminal 54 is powered and the switch 60 is in the on (upper) position. A second input terminal on the switch 60 is connected to the terminal 34, and a corresponding output terminal 68 is connected to a neutral start circuit through a transmission switch 20 such that initial engine start-up can be accomplished only when the transmission is in neutral and the PTO switch 60 is in the off (lower) position.

The terminal 68 of the PTO switch 60 is also connected via diode 70 to the coil of the relay 50 to initially activate the PTO relay 50 only if the PTO switch is in the off position. A bootstrap diode 72 connected between the output of the sensor switch 28 and the coil of the relay 50 maintains the coil 50 in the energized condition when the PTO switch 60 is moved up to the on position provided the sensor switch 28 is closed (no obstacle sensed).

A first ignition maintaining diode 80 is connected between the output of the sensor switch 28 and the input to the operator presence switch 24. The diode 80 provides a current path to the ignition relay 40 when the vehicle is in reverse (switch 22 open) and the PTO switch 60 is on, if the sensor switch 28 is closed (no obstacle sensed) and the operator is positioned on the vehicle (switch 24 closed).

A second maintaining diode 82 is connected between the terminal 68 and the switch 24. The diode 82 permits normal engine operation, if the operator presence switch 24 is closed, when the PTO switch is off (terminal 68 energized) and the transmission is in reverse (switch 22 open) regardless of the state of the sensor switch 28 or relay 50.

In operation for initial start-up, the transmission is placed in neutral so the switches 20 and 22 are closed, and the PTO switch is turned off to provide a closed path between the ignition terminal 34 and the neutral start circuit. The ignition switch 30 is turned to the start position to connect the terminal 34 to the positive terminal on the power source 32. The ignition relay 40 is activated to provide power to the ignition. Once the engine has started, the switch 30 is returned to the run position to maintain the power to the terminal 34. The PTO relay 50 is initially activated from the terminal 68 via diode 70 when the PTO switch 60 is off. Assuming no obstacle is sensed, the switch 28 is closed and bootstraps the PTO relay 50 on to power the terminal 60 so that the PTO is energized when the PTO switch 60 is moved up to the on position.

When the vehicle direction switch 22 is closed (neutral or forward position of the direction control 12), the ignition coil 40 is energized via the switches 22 and 24. If the tractor is shifted into reverse and the switch 22 opens with the PTO engaged, the ignition relay remains energized through the diode 80 and the switch 28 only if no obstacle is sensed and the switch 28 remains closed. If an obstacle is sensed while operating the vehicle in reverse with the PTO engaged, the ignition relay 40 will deactivate to stop the engine and deactivate the PTO relay. The operator can cause the engine to recover by turning the PTO switch 60 off to power terminal 68 or by moving the direction control from the reverse position to close the switch 22, either of which will again activate the relay 40 to provide power to the ignition. However, once the PTO relay 50 is deactivated, the only way to reactivate the relay 50 is through the diode 70 by moving the PTO switch 60 to the off position. The PTO relay will remain energized when the PTO switch is returned to the on position only if no obstacle is sensed and the switch 28 is closed.

Having described the preferred embodiment, it will become apparent that various modifications can be made without departing from the scope of the invention as defined in the accompanying claims.

I claim:

1. In a vehicle having an engine and a connected to the engine through a transmission with selectable forward and reverse drive modes, a power take off (PTO) selectively drivable by the engine to power a driven accessory and a PTO switch for activating and deactivating the PTO, an interlock circuit connected to the engine, the interlock circuit comprising:
   a sensor responsive to contact of the vehicle with an obstacle for providing a contact indication;
   a transmission switch responsive to the selected drive state of the transmission;
   means connecting the transmission switch and the sensor for disengaging the PTO in response to the presence of a contact indication and for shutting down the engine when the transmission is in a preselected state and the contact indication is present; and
   means for permitting the engine to recover from shut down when the contact indication is present when the transmission is shifted from the preselected state.

2. The invention as set forth in claim 1 including means for preventing reengagement of the PTO after disengagement until the contact indication is no longer provided.

3. The invention as set forth in claim 1 including means for permitting the engine to recover from shut down when the contact indication is present when the PTO switch is moved to the deactivating position.

4. The invention as set forth in claim 1 including means for preventing reengagement of the PTO after disengagement until the PTO switch is cycled.

5. In a vehicle having an engine, a ground drive transmission with selectable forward and reverse drive speed ranges, a power take off (PTO) selectively drivable by the engine to power a driven accessory and an operable PTO switch for activating and deactivating the PTO, an interlock circuit connected to the engine, the interlock circuit comprising:
   a sensor responsive to the presence of an obstacle in the path of the vehicle for providing a contact indication;
   a transmission switch responsive to the selected drive state of the transmission;
   an ignition relay;
   circuit means connecting the transmission switch, the sensor, and the ignition relay for shutting down the engine when the transmission reverse drive is selected and the contact indication is present; and
   means connecting the PTO switch to the ignition relay for facilitating engine recovery, before the engine is shut down completely, when the PTO switch is moved to the deactivating position in the presence of a contact indication.

6. The invention as set forth in claim 5 including means for disengaging the PTO in response to the presence of a contact indication.

7. The invention as set forth in claim 5 wherein the circuit means includes means connecting the transmission switch to the ignition relay for facilitating engine recovery when the transmission is shifted from reverse during presence of a contact indication.

8. The invention as set forth in claim 6 wherein the means for disengaging the PTO includes means for preventing reengagement of the PTO without operation of the PTO switch.

9. The invention as set forth in claim 8 including means for preventing reengagement of the PTO after disengagement until the contact indication is no longer provided.

10. The invention as set forth in claim 8 wherein the means for disengaging the PTO includes a relay having a control terminal connected to the sensor.

11. The invention as set forth in claim 10 wherein the relay has a switched output terminal and a control terminal bootstrapped to the switched output terminal through the sensor.

12. The invention as set forth in claim 11 wherein the circuit means includes a diode connected between the sensor and the ignition relay.

* * * * *